United States Patent [19]
Becker

[11] Patent Number: 5,549,129
[45] Date of Patent: Aug. 27, 1996

[54] RETRACTABLE ENCLOSURE FOR VEHICLE AWNING

[75] Inventor: Kent Becker, Rome City, Ind.

[73] Assignee: White Consolidated Industries, Inc., Cleveland, Ohio

[21] Appl. No.: 401,726

[22] Filed: Mar. 10, 1995

[51] Int. Cl.[6] .................................................. E04H 15/06
[52] U.S. Cl. ........................... 135/88.15; 135/88.13; 160/58.1
[58] Field of Search .................... 135/88.1, 88.12, 135/88.13, 88.15, 88.17, 88.18; 52/63; 160/57, 58.1

[56] References Cited

U.S. PATENT DOCUMENTS

| | | |
|---|---|---|
| 107,584 | 9/1870 | Schneider . |
| 300,962 | 6/1884 | Fox . |
| 1,030,493 | 6/1912 | Sorenson ................................. 160/58.1 |
| 1,483,741 | 2/1924 | Moffett .................... 135/88.13 |
| 1,789,747 | 5/1930 | Heerwagen . |
| 1,809,966 | 4/1929 | Fogh . |
| 2,107,608 | 8/1937 | Hewlett . |
| 2,122,681 | 7/1938 | Dykes ..................... 135/88.13 |
| 2,574,423 | 11/1951 | Sweeney ..................... 160/57 |
| 2,583,824 | 1/1952 | Dwinell et al. . |
| 4,010,973 | 3/1977 | Heinrich . |
| 4,195,877 | 4/1980 | Duda . |
| 4,901,745 | 2/1990 | Rice ..................... 135/88.13 |
| 5,170,811 | 12/1992 | Kirk et al. .................. 135/88.13 X |
| 5,171,056 | 12/1992 | Faludy et al. ............... 135/88.12 X |
| 5,246,052 | 9/1993 | Homan ........................ 135/88.12 X |

*Primary Examiner*—Lanna Mai
*Attorney, Agent, or Firm*—Pearne, Gordon, McCoy & Granger

[57] ABSTRACT

An awning is provided with a portable enclosure. Enclosure walls are rollable on a pair of vertical enclosure rollers mounted on a wall at ends of the awning. The enclosure walls are supported by spring loaded tailpieces disposed between leading and trailing edges of the awning. The upper edge of the enclosure is secured to the awning and the lower edge is folded at the ground. The enclosure walls are joined at the middle of the awning to enclose the space below the awning. The rollers are removable from the wall for storage of the enclosure.

18 Claims, 5 Drawing Sheets

RETRACTABLE ENCLOSURE FOR VEHICLE AWNING

BACKGROUND OF THE INVENTION

1. Field of the Invention

This invention relates generally to the field of awnings and specifically to retractable enclosure erected with an awning.

2. Description of the Related Art

Recreational vehicles are commonly provided with retractable awnings adapted to provide a shelter adjacent the vehicle. Such awnings may also be mounted on buildings or other structures. The awning is usually a flexible sheet rollable on a roller for storage. One edge of the awning is attached at a wall of the vehicle and an opposite edge is supported on a pair of support arms extending from the wall or the ground.

The awning only provides a cover over the space adjacent the vehicle, but it is often desirable to provide a shelter around the sides of the space, as well. U.S. Pat. No. 107,584 to Yenne, U.S. Pat. No. 300,962 to Fox, U.S. Pat. No. 1,789,747 to Heerwagen, U.S. Pat. No. 1,809,966 to Fogh, U.S. Pat. No. 2,107,608 to Hewlett, U.S. Pat. No. 2,583,824 to Dwinell, U.S. Pat. No. 4,010,973 to Heinrich, and U.S. Pat. No. 4,195,877 to Duda, all incorporated herein by reference, show retractable awnings with retractable side walls.

Still, the need exists for an awning enclosure that is portable and simple to erect and store. The enclosure should provide privacy and a degree of isolation from weather and pests. The space adjacent the vehicle should be enclosed by the vehicle wall, awning, and enclosure to create an additional room.

SUMMARY OF THE INVENTION

The present invention provides a retractable enclosure for mounting with an awning. The awning has a leading edge and a trailing edge connected by opposed side edges. The trailing edge is secured near a generally vertical wall and the leading edge is supported in an extended position to form a generally horizontal shelter. The enclosure includes first and second generally vertical enclosure rollers mountable on the vertical wall below respective side edges of the awning. First and second enclosure walls are rollable on respective enclosure rollers, and the enclosure walls are supportable below respective side edges and the leading edge of the awning in the extended position to enclose a space beneath the awning.

The enclosure walls are joinable below the leading edge of the awning. Upper edges of the enclosure walls are securable to the awning. A pair of generally horizontal tailpieces are disposed between the leading and trailing edges of the awning, said enclosure walls being supported by respective tailpieces. The tailpieces are biased toward an extended position thereby supporting the tailpiece between the leading edge and the vertical wall. A pair of support poles support the leading edge of the awning. The tailpieces are biased toward an extended position and are disposed between the support poles and the vertical wall. The tailpieces extend through respective pockets along upper edges of the enclosure walls and suspend the enclosure walls. Upper edges of front sections of the enclosure walls are fastened at the leading edge of the awning. A fastener is provided to connect leading edges of the enclosure walls to each other. A skirt is attached along a lower edge of the vertical wall to close a space between the wall and a ground surface. Bottom edges of the enclosure walls are adapted to be folded inwardly at a ground surface and secured in place by a fastener. The bottom edges of the enclosure walls extend downwardly beyond lower ends of the enclosure rollers and are adapted to be folded upwardly to accommodate rolling on the enclosure rollers.

The enclosure rollers are removably mountable on the vertical wall. Bracket assemblies are provided for removably mounting the rollers on the vertical wall. Each bracket assembly includes a "Z" bracket pivotably mounted at an end of each enclosure roller and a corresponding angle bracket mounted on the vertical wall and having a slot adapted to receive the "Z" bracket therein.

Preferably, the enclosure is erected with a recreational vehicle having a roll type awning with either a shifting roller or a stationary roller and a lead rail. The tailpieces are braced between the vehicle and either the roller or the lead rail. The invention can also be used with other types of awnings or shelters to provide retractable side walls forming an enclosure.

DESCRIPTION OF THE PREFERRED EMBODIMENTS

Figure 1:
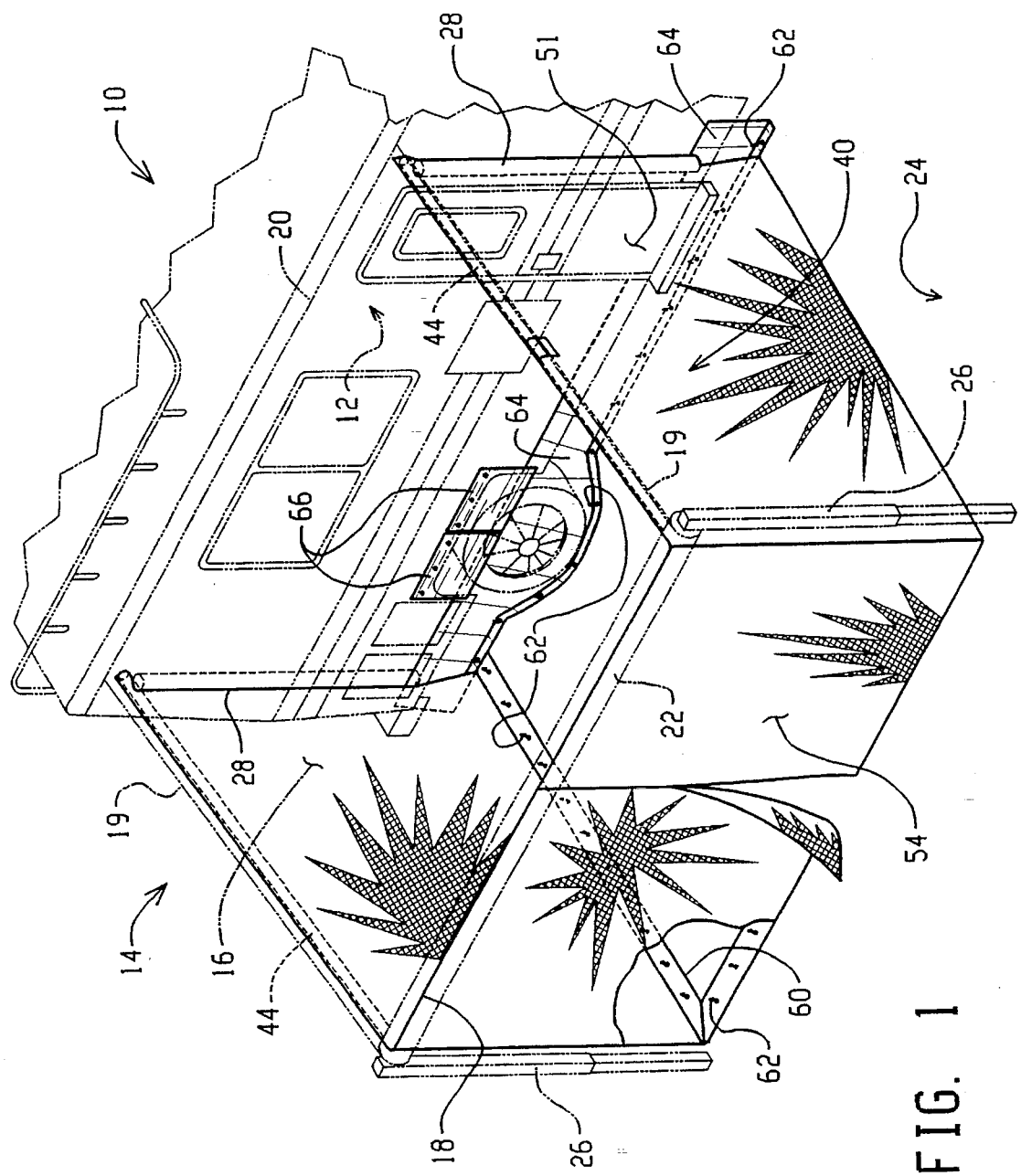
FIG. 1 shows a perspective view of an awning and enclosure mounted on a recreational vehicle according to the invention, the awning and vehicle being shown in phantom.

Referring to FIG. 1, a structure, such as a recreational vehicle 10, has a generally vertical wall 12. An awning assembly 14 is mounted at a suitable height on the wall 12. The awning assembly 14 includes an awning 16 having a leading edge 18, side edges 19, and a trailing edge 20. The awning 16 is rollable on a transversely movable roller 22, such as a roller tube, rotatably mounted at the wall 12. The leading edge 18 of the awning 16 is secured to the roller 22. The trailing edge 20 is secured to the wall 12. In an alternative awning assembly construction known in the art, the leading edge 18 is secured to a lead rail and the roller 22 is fixed to the wall 12.

In an extended position, shown in FIG. 1, the roller 22 and leading edge 18 of the awning 18 are supported above a ground surface 24 by a pair of support poles 26. The awning 16 is maintained in the extended position by a pair of tension rafters (not shown) disposed between the leading and trailing edges 18, 20. As described to this point, the awning assembly is conventional and represents merely an example of an awning with which the present invention can be erected.

Figure 2:
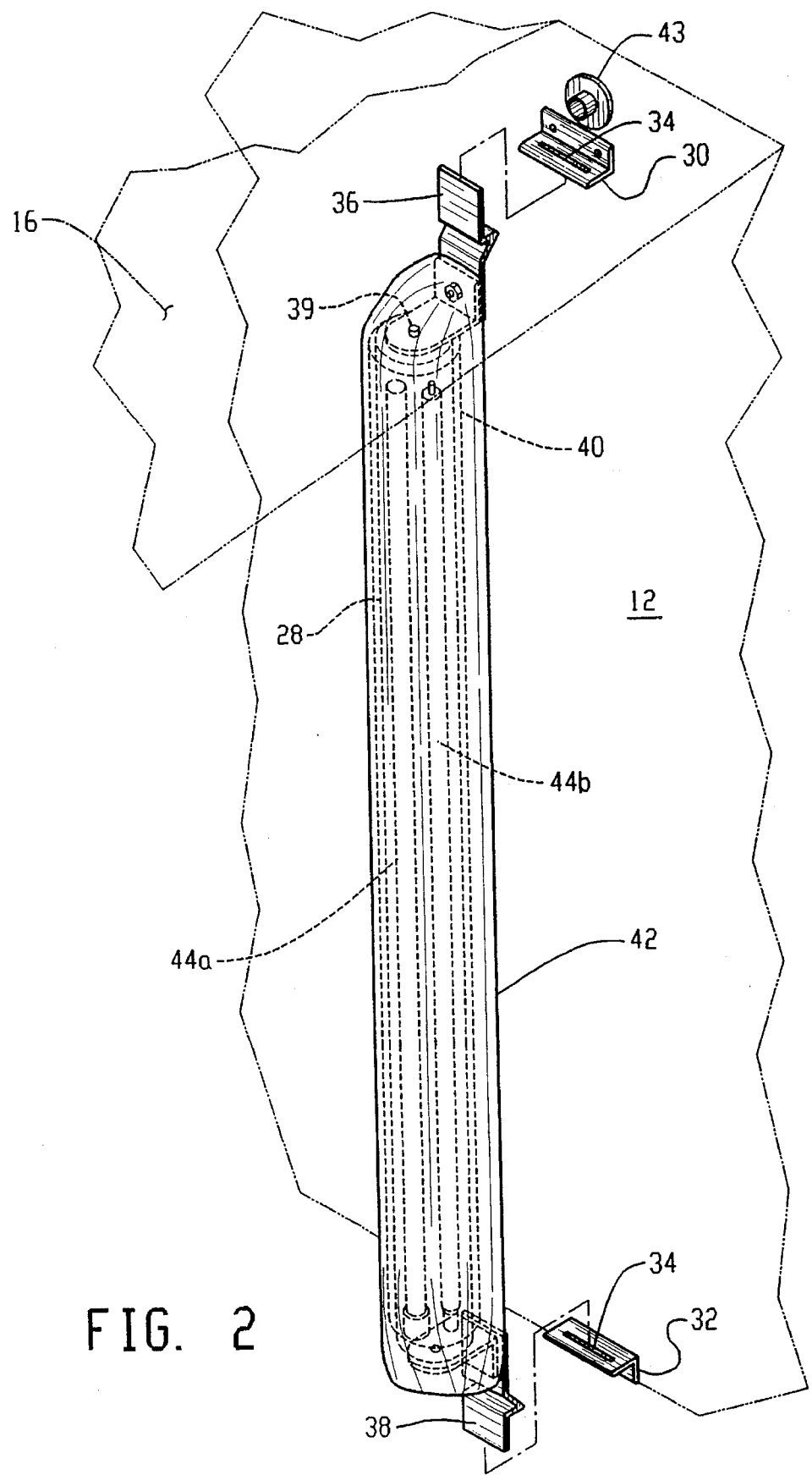
FIG. 2 shows a detailed view of an enclosure roller removed from a wall of the vehicle.

Referring to FIG. 2, a generally vertical enclosure roller 28 is mounted at the wall 12 by a bracket assembly. The bracket assembly includes an upper angle bracket 30 and a lower angle bracket 32 mounted at vertically spaced positions on the wall 12. Each angle bracket 30, 32 includes a rectangular slot 34. The enclosure roller 28 has an upper "Z" bracket 36 mounted on one end and a lower "Z" bracket 38 mounted on the other end. The enclosure roller 28 is pivotably mounted on the "Z" brackets 36,38 on a generally vertical axle 39.

Figure 2A:
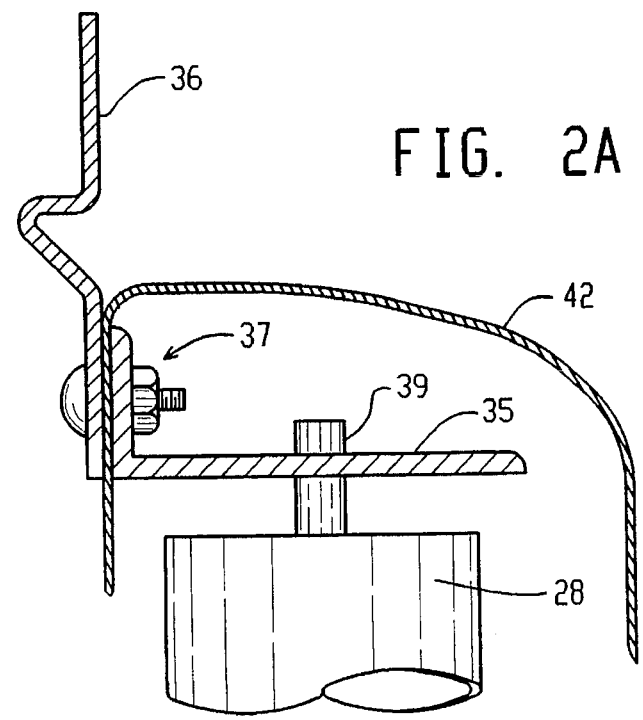
FIG. 2A shows a detailed view of an end of the enclosure roller.

As shown in FIG. 2A, the axle 39 is secured in a plate 35 mounted to the upper "Z" bracket 36 by a nut and bolt assembly 37. An enclosure bag 42 is sandwiched between the plate 35 and bracket 36. The enclosure roller 28 is pivotable on the axle 39. The lower "Z" bracket 38 and associated axle are similarly assembled.

Referring to FIG. 2, the "Z" brackets 36, 38 are adapted to be received in respective slots 34 of the angle brackets 30, 32. To mount the enclosure roller 28, the upper "Z" bracket is inserted in its corresponding slot 34. The roller 28 is lifted on its vertical axis and the lower "Z" bracket 38 is positioned above its corresponding slot 34. The roller 28 is lowered so that the lower "Z" bracket enters the slot 34. As shown, the upper "Z" bracket 36 is longer than the lower "Z" bracket 38 to ensure that the enclosure roller 28 remains securely mounted at the wall 12. Other means of removably or permanently mounting the enclosure roller 28 to the wall 12 are also suitable.

Figure 3:
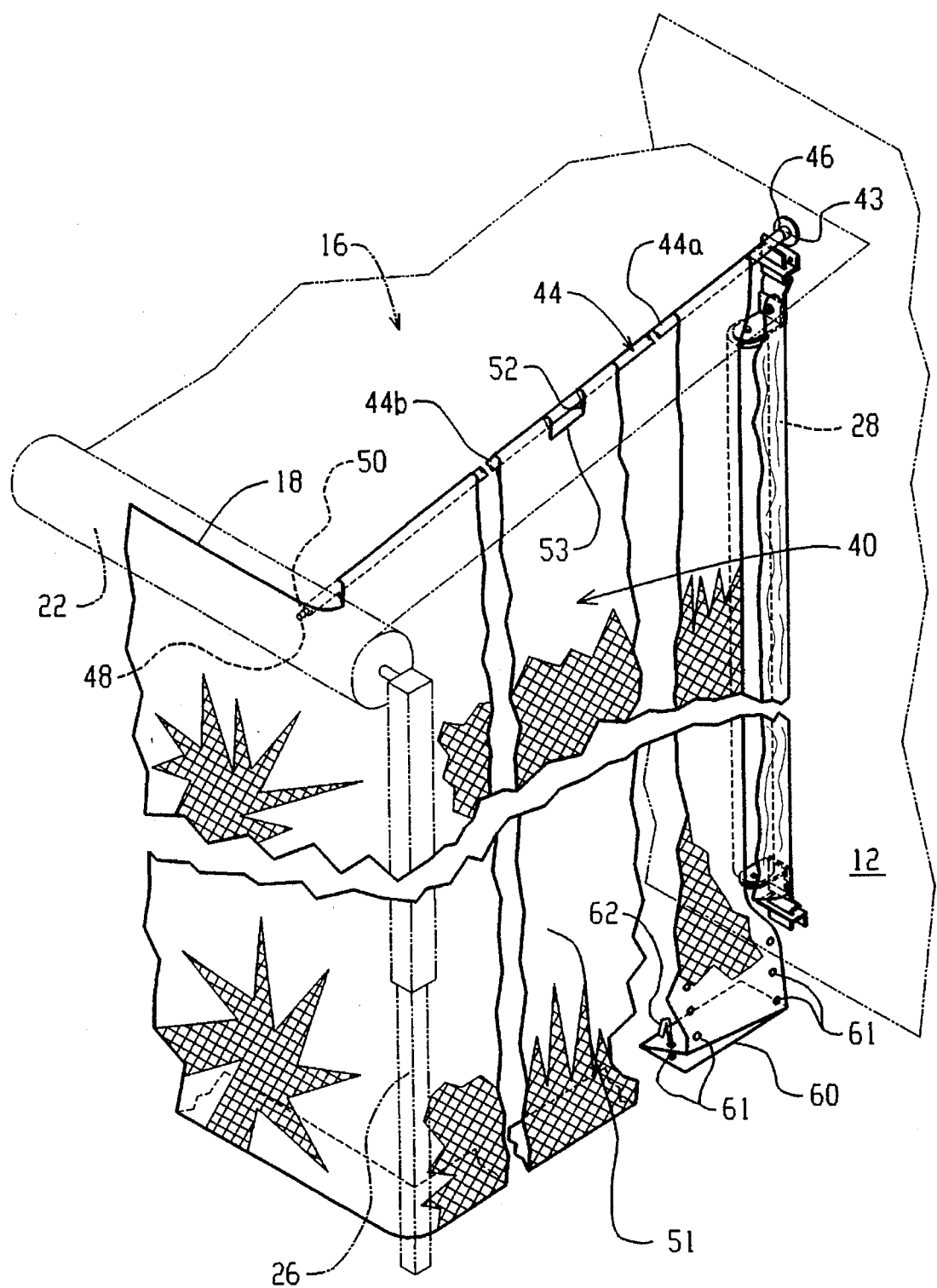
FIG. 3 shows a detailed view of a side and corner of the enclosure.

Referring to FIGS. 2 and 3, an enclosure wall 40 is rolled on the enclosure roller 28. The enclosure wall is any suitable fabric such as vinyl or canvas, preferably provided with screens and/or transparent windows and foldable or rollable privacy panels. In a retracted position, shown in FIG. 2, the enclosure roller 28 and enclosure wall 40 are stowed in the enclosure bag 42, which is preferably a canvas or vinyl cover having a zipper or other closure. A tailpiece support 43, such as a base with an annular flange, is mounted above the upper angle bracket 30. A tailpiece 44 comprising a pole or rod, described below, is also stowed in the bag 42.

Referring to FIG. 3, the tailpiece 44 is preferably a spring loaded, telescoping two piece pole having a rear component 44a with resilient foot 46, such as a rubber cap, at one end. The other end of the tailpiece 44 is a front component 44b provided with a fastener, such as a projection 48 adapted to be received in an aperture 50 in the roller 22 (or lead rail where appropriate).

Figure 3A:
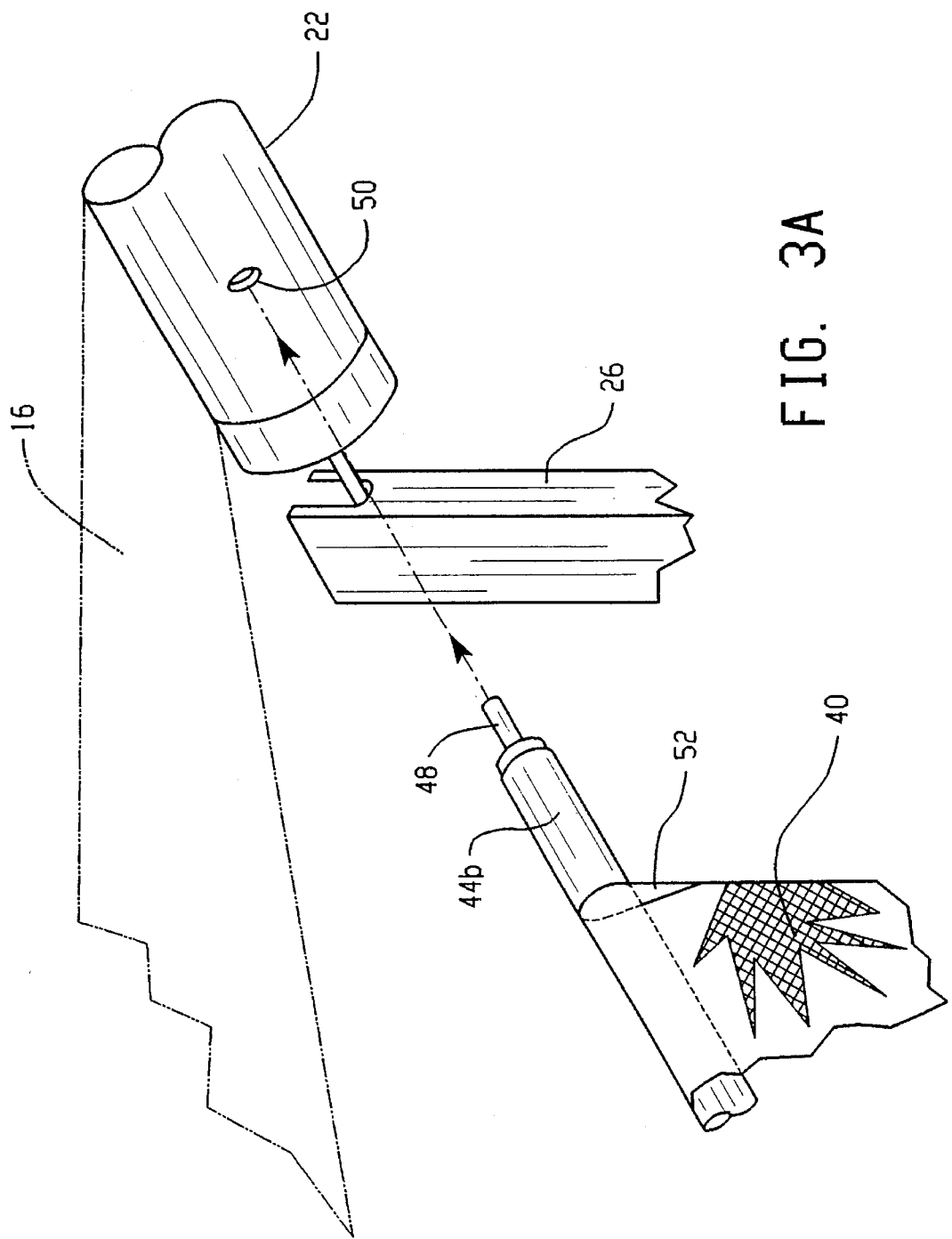
FIG. 3A shows a detailed view of the corner viewed from inside the enclosure.

A side section 51 of the enclosure wall 40 is provided with a tailpiece pocket 52 along an upper edge. The pocket 52 preferably comprises a sewn hem providing a passage adapted to receive the tailpiece 44 therethrough. A gap 53 in the pocket 52 is provided to ease assembly. The tailpiece 44 is located between the lead rail 23 and the wall 12 and is spring biased to maintain a generally horizontal position. The projection 48 of the tailpiece 44 is inserted in the aperture 50 in the roller 22, as shown in FIG. 3A. The foot 46 of the tailpiece 44 is inserted in the tailpiece support 43. The side section 51 of the enclosure wall 40 is suspended from the tailpiece 44 to close the space between the wall 12 and the support pole 26. If desired, the upper edge of the side section 51 can be provide with a flap (not shown) suitable for attaching to the awning 16 with an appropriate fastener (not shown). Preferably, the side edges 19 of the awning extend slightly past the side walls 51 of the enclosure to permit runoff outside the enclosure.

Figure 4:
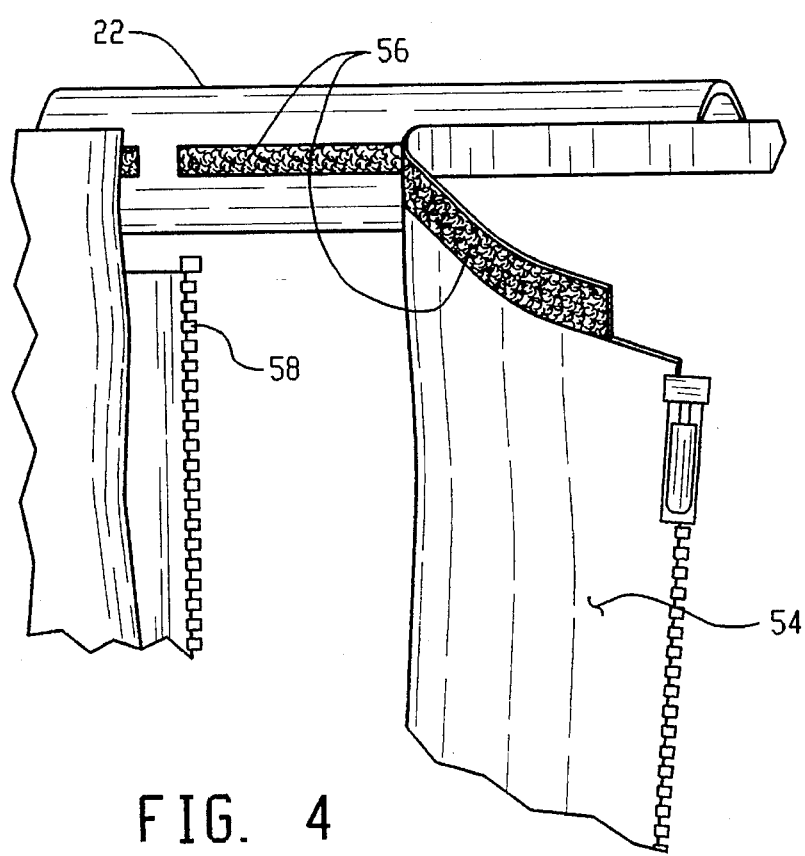
FIG. 4 shows a detailed view of enclosure walls attached to a roller at a leading edge of the awning viewed from inside the enclosure.

As shown in FIG. 1, the enclosure wall 40 has a front section 54 that extends from near the support pole 26 along the leading edge 18 of the awning 16 to about the middle of the awning. As shown in FIG. 4, an upper edge of the front section 54 is attached to the roller 22 by a suitable fastener 56, such as a hook and loop fastener or snaps. Other means of removably supporting the enclosure wall 40 below the edges 18, 19 of the awning 16 can also be used, such as suspending the wall directly from the awning 16 or a flexible cord or tying the wall to the tailpiece 44.

Referring again to FIG. 1, an enclosure roller 28 is located at each end of the awning below respective side edges 19 of the awning 16. The enclosure walls 40 from each of the enclosure rollers 28 meet near the middle of the awning 16 and are fastened together with a suitable fastener, such as a zipper 58 (shown in FIG. 4).

To erect the enclosure, one enclosure bag 42, containing one enclosure roller 28, one enclosure wall 40, and, preferably, one disassembled tailpiece 44, is removed from stowage in a compartment of the vehicle 10 or other suitable location. Referring to FIG. 2, the enclosure roller 28 is mounted on the wall 12 by inserting the upper "Z" bracket 36 in the upper angle bracket 30, sliding the enclosure roller 28 upwardly, inserting the lower "Z" bracket 38 in the lower angle bracket 32, and lowering enclosure roller 28 to rest on the lower angle bracket 32. The enclosure bag 42 is opened and the parts of the tailpiece 44 are removed from the bag. The other enclosure roller 28 is installed in a similar manner. The awning 16 is now erected in a conventional manner, as shown in FIG. 1.

Referring to FIG. 3, the enclosure wall 40 is unrolled from the roller 28. Lower and upper edges of the enclosure walls 40 extend beyond ends of the roller 28 to the ground 24 and tailpiece 44, respectively. These are folded inwardly in the retracted position and unfolded when the enclosure wall is unrolled. The rear tailpiece component 44a is threaded into the tailpiece pocket 52 until the foot 46 projects therefrom. The front component 44b is also threaded into the tailpiece pocket 52 and connected to the rear component 44a. As shown in FIGS. 3 and 3A, the tailpiece is compressed and the projection 48 is inserted into the aperture 50 in the roller 22 (or lead rail, as applicable). The foot 46 is inserted in the tailpiece support 43, and the spring loading of the tailpiece 44 firmly engages the projection 48 in the aperture 50 and holds the tailpiece 44 in a generally horizontal position supporting the side section 51 of the enclosure wall 40. The front section 54 of the enclosure wall 40 is extended to about the middle of the roller 22 and the upper edge of the wall is secured to the roller 22 using the fastener 56, as shown in FIG. 4. The other enclosure wall 40 and tailpiece 44 are installed in a similar manner. Leading edges of the two enclosure walls are then connected with the zipper 58.

Referring to FIGS. 1 and 3, lower edges 60 of the enclosure walls 40 are folded to lay flat on the ground 24. Regularly spaced grommets 61 are provided near the lower edge 60 of the wall 40. The walls are rolled or folded to correspond with the height of the ground, and the grommets 61 are aligned. The walls 40 are secured in place by stakes 62 or other suitable fasteners driven through the grommets. A skirt 64 and wheel well covers 66 are mounted with snaps or the like along a lower edge of the vehicle 10 to close the rear side of the enclosure.

To disassemble the enclosure, the steps described above are reversed. The enclosure components are easily stowed in a suitable location.

The present disclosure describes several embodiments of the invention, however, the invention is not limited to these embodiments. Other variations are contemplated to be within the spirit and scope of the invention and appended claims.

What is claimed is:

1. A vehicle having a retractable enclosure, comprising:
   a recreational vehicle, having a generally vertical side wall;
   a generally horizontal awning roller extending along an upper edge of the side wall;
   an awning and having a leading edge and a trailing edge connected by opposed side edges, the awning being rollable on awning roller, the trailing edge being secured near the vertical wall;
   a pair of support arms for supporting a leading edge of the awning;
   first and second generally vertical enclosure rollers secured at the side wall adjacent and below opposite ends of the awning roller;
   first and second enclosure walls rollable on the first and second vertical rollers, respectively, said enclosure walls each having a pocket along an upper edge; and
   first and second tailpieces extending through the pockets and disposed between the leading edge and the side wall, the enclosure walls being supported from the tailpieces and the leading edge and being joinable at leading edges thereof to enclose a space below the awning.

2. A retractable enclosure for mounting with an awning, said awning having a leading edge and a trailing edge connected by opposed side edges, the trailing edge being secured near a generally vertical wall and the leading edge being supported in an extended position to form a generally horizontal shelter, said enclosure comprising:
   first and second generally vertical enclosure rollers mountable on the vertical wall below respective side edges of the awning; and
   first and second enclosure walls rollable on respective enclosure rollers, the enclosure walls being supportable below respective side edges and the leading edge of the awning in the extended position to enclose a space beneath the awning.

3. An enclosure according to claim 2, wherein the enclosure walls are joinable below the leading edge of the awning.

4. An enclosure according to claim 2, wherein upper edges of the enclosure walls are securable to the awning.

5. An enclosure according to claim 2, further comprising a pair of generally horizontal tailpieces disposed between the leading and trailing edges of the awning, said enclosure walls being supported by respective tailpieces.

6. An enclosure according to claim 5, wherein the tailpieces are biased toward an extended position thereby supporting the tailpiece between the leading edge and the vertical wall.

7. An enclosure according to claim 5, further comprising a pair of support poles supporting the leading edge of the awning, wherein the tailpieces are biased toward an extended position and are disposed between the support poles and the vertical wall.

8. An enclosure according to claim 5, further comprising pockets along upper edges of the enclosure walls, said tailpieces extending through respective pockets and suspending the enclosure walls.

9. An enclosure according to claim 8, wherein upper edges of front sections of the enclosure walls are fastened at the leading edge of the awning.

10. An enclosure according to claim 2, further comprising a fastener adapted to connect leading edges of the enclosure walls to each other.

11. An enclosure according to claim 2, further comprising a skirt adapted to be attached along a lower edge of the vertical wall to close a space between the wall and a ground surface.

12. An enclosure according to claim 2, wherein bottom edges of the enclosure walls are adapted to be folded inwardly at a ground surface and secured in place by a fastener.

13. An enclosure according to claim 2, wherein bottom edges of the enclosure walls extend downwardly beyond lower ends of the enclosure rollers, said enclosure walls being adapted to be folded upwardly to accommodate rolling on the enclosure rollers.

14. An enclosure according to claim 2, wherein the enclosure rollers are removably mountable on the vertical wall.

15. An enclosure according to claim 14, further comprising bracket assemblies adapted for removably mounting the rollers on the vertical wall, each bracket assembly comprising a "Z" bracket pivotably mounted at an end of each enclosure roller and a corresponding angle bracket mounted on the vertical wall and having a slot adapted to receive the "Z" bracket therein.

16. A retractable enclosure for mounting on a generally vertical wall, comprising:
   a generally horizontal awning roller disposable along the vertical wall;
   an awning having a leading edge and a trailing edge connected by opposed side edges, the awning being rollable on awning roller, the trailing edge being secured near the vertical wall;
   a pair of support arms supporting the leading edge of the awning in an extended position, the awning forming a generally horizontal shelter;
   first and second generally vertical enclosure rollers mountable on the vertical wall below respective ends of the awning roller; and
   first and second enclosure walls rollable on respective enclosure rollers, the enclosure walls being supportable below respective side edges and the leading edge of the awning in the extended position to enclose a space beneath the awning.

17. An enclosure according to claim 16, further comprising a pair of tailpieces disposed along the side edges between the leading edge of the awning and the vertical wall, said enclosure walls being suspended from the tailpieces.

18. An enclosure according to claim 17, wherein the enclosure walls are joinable with each other.

* * * * *